June 10, 1969

C. W. ADAMS ET AL 3,449,231

OXYGEN SENSOR WITH RHODIUM CATHODE

Filed June 22, 1966

CLARENCE W. ADAMS
GEORGE MATSUYAMA
INVENTORS

BY Thomas L. Peterson

ATTORNEY

United States Patent Office 3,449,231
Patented June 10, 1969

3,449,231
OXYGEN SENSOR WITH RHODIUM CATHODE
Clarence W. Adams, Orange, and George Matsuyama, Fullerton, Calif., assignors to Beckman Instruments, Inc., a corporation of California
Filed June 22, 1966, Ser. No. 559,431
Int. Cl. B01k *3/12, 3/04, 3/06*
U.S. Cl. 204—195                          5 Claims

ABSTRACT OF THE DISCLOSURE

A steam sterilizable polarographic cell for determining oxygen in a sample without appreciable interference resulting from any carbon dioxide in the sample. The cell includes an anode and cathode joined by an electrolyte and separated from the sample by a selectively permeable membrane. The cathode contains rhodium and is fusion sealed within a glass body of the cell.

---

This invention relates to an electrochemical cell and, more particularly, to an electrochemical cell for polarographic analysis of oxygen in a sample.

A number of electrode assemblies are now commercially available which may be used to determine the partial pressure of oxygen in a liquid or gaseous medium being analyzed by a thin membrane, such as polyethylene, which is permeable to oxygen in the medium. The cathode is generally formed of either platinum wire fused into a glass tube or a gold wire sealed into a plastic tube, and the anode is formed of a silver tube or a band of silver foil wrapped around the glass or plastic tube. A thin film of a suitable electrolyte, for example, a gelled potassium chloride solution, electrolytically couples the anode and cathode and is held in place by the oxygen permeable membrane. With a suitable polarizing voltage across the electrodes, when oxygen passes through the membrane, it is electrolytically reduced at the cathode and this reaction causes a current flow between the electrodes that is directly proportional to the partial pressure of oxygen in the medium being analyzed.

For certain applications of the polarographic oxygen cell, it is necessary that the cathode be fusion-sealed into a glass tube. This requirement must be met when it is desired to steam sterilize the polarographic cell in which case there can be no leaks or cracks between the cathode and the body in which it is sealed. A platinum cathode has the advantage that it can be readily fusion-sealed into a glass tube. However, platinum has the disadvantage that it is subject to interference by carbon dioxide in the sample medium, thus causing the polarographic cell to generate a current in excess of that which would be generated if there were no interference by the carbon dioxide. Thus, in those applications where the sample medium contains appreciable amounts of carbon dioxide, as occurs in the analysis of certain waters, beer process streams, and certain gaseous mediums, a polarographic cell incorporating a platinum cathode is undesirable. A gold cathode has the advantage that it is not subject to interference by carbon dioxide in the sample medium. However, gold cannot be fusion-sealed in glass. Even when a glass has been selected having the same coefficient of thermal expansion as gold, it has been found that when a gold wire fused into such a glass is subjected to a thermal shock, such as an increase of about 20° C., the glass cracks, thus breaking the fusion seal between the gold cathode and the glass. It is believed that this results from the fact that gold conducts heat faster than glass and, hence, expands quicker causing the glass to crack. It has even been found that a glass tube having a gold wire sealed therein cracks at room temperature, although the glass has been annealed. Therefore, it is apparent that where it is desired to fusion-seal a cathode material into a glass body of a polarographic cell, and where carbon dioxide interference must be eliminated, platinum and gold cathodes are unsuitable.

It is, therefore, the principal object of the present invention to provide a polarographic oxygen cell in which the cathode of the cell may be fusion-sealed to glass and the cell is not subject to interference by carbon dioxide in a sample medium.

Another object of the invention is to provide an improved polarographic oxygen cell which is steam-sterilizable and not subject to carbon dioxide interference.

According to the principal aspect of the present invention, it has been discovered that a polarographic oxygen cell may be provided which is not subject to carbon dioxide interference and in which the cathode of the cell may be fusion-sealed in glass when the cathode contains rhodium.

Other objects, aspects and advantages will become apparent from the following description taken in connection with the accompanying drawing wherein.

Figure 1:
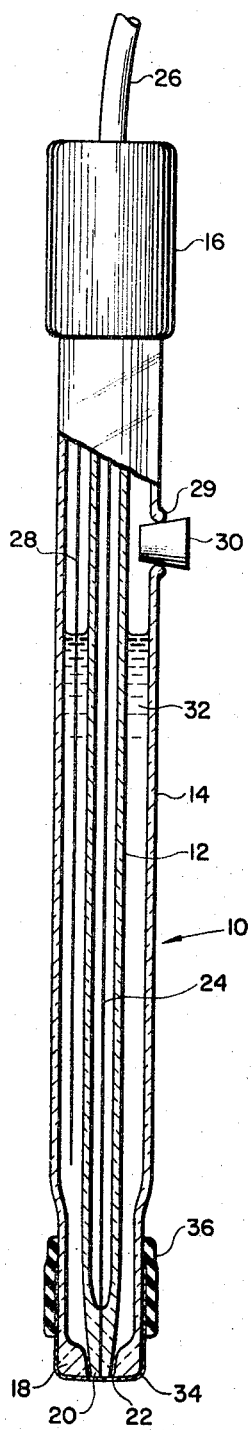
FIG. 1 is a partial longitudinal sectional view of a polarographic oxygen cell incorporating the teachings of the present invention.
Figure 2:
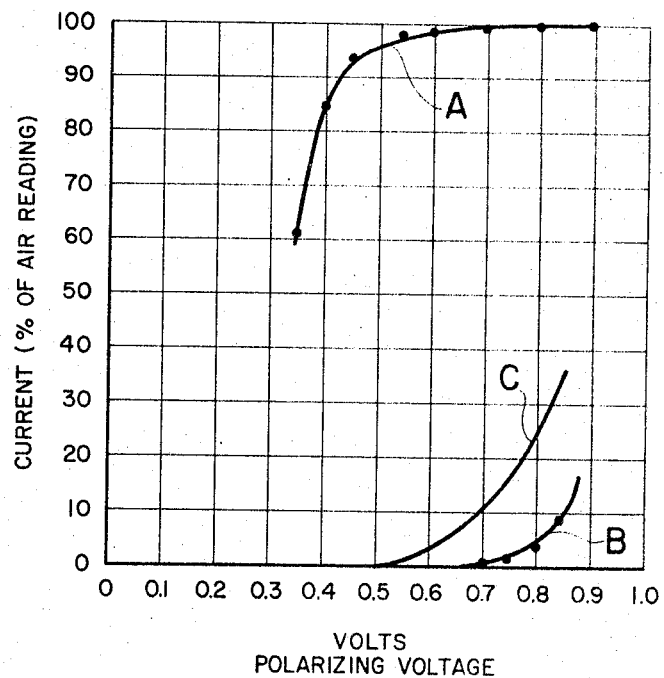
FIG. 2 is a graph showing current-voltage curves for polarographic cells incorporating platinum and rhodium cathodes.

Referring now to the drawing in detail, there is shown a polarographic oxygen cell, generally indicated at 10, which comprises an inner glass tube 12 and an outer glass tube 14 closed at one end by a suitable cap 16. At the forward end of the cell 10, the outer glass tube has an inwardly extending flange 18 which receives the conical tip 20 of the inner glass tube, defining therebetween a narrow annular passage 22. The cathode of the cell is in the form of a wire 24 fusion-sealed into the tip end 20 of the inner glass tube 12 with the end of the wire 24 flush with the face of the tip end 20. The wire 24 extends rearwardly through the tube 14 for connection to a suitable cable 26. Between the inner and outer glass tubes 12 and 14 there is positioned a silver wire 28 which forms the anode of the cell. The rear portion of the wire 28 is also connected to the cable 26 which leads to a suitable polarographic analysis instrument, not shown. An opening 29 in the side of the outer glass tube 14 is closed by a rubber stopper 30. The opening 29 is provided to permit access to the annular space between the tubes 12 and 14, to permit the filling of the span with a suitable electrolyte 32. An oxygen permeable membrane 34 is positioned over the forward end of the tubes 12 and 14 and is secured to the outer tube 14 by a rubber sleeve 36. The membrane serves to separate the anode and cathode from the sample medium and also defines between the membrane and the tip end 20 of the glass tube 12 an electrolyte film space which is in communication with the main body of electrolyte 32 in the cell via the narrow annular passage 22. As is well known in the art, when oxygen diffuses through the membrane 34, it is reduced at the cathode 24, thus generating an electrical current which is an indication of the partial pressure of oxygen in the sample medium.

In accordance with the present invention, it has been discovered that a cathode containing rhodium not only may be fusion-sealed into the glass tube 12, but also is virtually unaffected by carbon dioxide in the sample medium. Preferably the cathode 24 takes the form of a substantially pure rhodium wire, as illustrated in FIG. 1. However, it may also be an alloy of rhodium if it is essentially devoid of platinum, that is, if it contains only trace amounts of platinum as normally exists in rhodium. For example, the rhodium may be alloyed with other noble metals, excluding platinum, as for example, iridium or gold. In the latter case, the gold should be included in a sufficiently small amount as to not affect the ability of the wire 24 to be fusion-sealed into the glass tube 12.

While it is generally desired to have the entire cathode wire 24 formed of the same material, it is contemplated by the present invention that the cathode may be a noble metal wire coated over its entire surface with a layer 38 of rhodium.

By way of example only and not by way of limitation, a polarographic cell has been constructed as shown in FIG. 1 wherein the glass tubes 12 and 14 were formed of Corning 0010 lead glass. A .005 inch diameter rhodium wire was fusion-sealed into the forward end of the inner glass tube 12 of the cell. The anode was a silver wire and the electrolyte 3% KCl. The cell was connected to a suitable polarographic instrument for impressing various polarizing voltages across the anode and cathode. The current-voltage curves for the cell are shown in the graph illustrated in FIG. 3 of the drawing, wherein the ordinate is the current in terms of the "percent of air reading" and the abscissa is the polarizing voltage in "volts." The instrument calibrated so that at 0.8 polarizing voltage, there would be a reading of 100% if the sample were air, which contains only about 0.04% carbon dioxide. Curve A in FIG. 3, which is based upon several plot points, shows the current-voltage relationship of the polarographic cell of the invention incorporating a rhodium cathode where the sample medium is air. It can be seen that with a polarizing voltage of 0.8, the current reading is 100%. Curve B shows the effect of the rhodium cathode, for four different polarizing voltage readings, where the sample is 100% carbon dioxide. At the polarizing voltage of 0.8, at which the instrument is calibrated, it is seen that there is generated by the cell of the invention a current which is about 4% of air reading. Thus, by the use of a rhodium cathode, there is only about 4% error when the cell is subjected to 100% carbon dioxide, which is equivalent to the performance of a gold cathode. In comparison, curve C is a typical current-voltage curve for a polarographic cell containing a platinum cathode in a 100% carbon dioxide sample. At 0.8 polarizing voltage, it is seen that there is about a 23% air reading with the cell incorporating the platinum cathode. Thus, by comparing curves B and C, it can be readily appreciated that the interference resulting from carbon dioxide in the sample is approximately six times greater with a polarographic cell incorporating platinum as the cathode rather than rhodium. Steam sterilization of the cell did not adversely affect its performance, thus showing that the rhodium wire was completely sealed into the glass tube of the cell.

Thus, by the present invention there is provided a polarographic oxygen cell in which the cathode containing rhodium may be fusion-sealed to glass, thus rendering the cell suitable for use at high temperatures and steam sterilization, and having the advantage that the cell is virtually unaffected by any interference resulting from carbon dioxide in the sample medium.

Although several embodiments of the invention have been disclosed herein for purposes of illustration, it will be understood that various other changes can be made in the material, form, details, arrangement and proportions of the various parts in such embodiments without departing from the spirit and scope of the invention as defined by the appended claims.

What is claimed is:
1. In a steam sterilizable polarographic cell for determining oxygen in a sample without appreciable interference resulting from any carbon dioxide in the sample, the combination of:
   a glass body;
   an anode and a cathode adapted to be joined by an electrolyte;
   said cathode being fusion-sealed into said glass body except for an exposed end;
   a membrane permeable to oxygen but impermeable to the electrolyte positioned so as to separate the electrodes and electrolyte from the sample being analyzed; and
   at least the surface layer of said cathode which is fusion-sealed into said glass body and said exposed end of said cathode containing rhodium and being essentially devoid of platinum and of an amount of gold that would impair the fusion seal ability of the surface layer to glass.
2. A cell as set forth in claim 1 wherein said cathode consists of substantially pure rhodium.
3. A cell as set forth in claim 1 wherein said cathode is formed entirely of a rhodium alloy.
4. A cell as set forth in claim 1 wherein said cathode is formed of a noble metal other than rhodium and having a coating of substantially pure rhodium thereon.
5. A cell as set forth in claim 1 wherein said cathode is a rhodium wire.

References Cited
UNITED STATES PATENTS

| | | | |
|---|---|---|---|
| 3,098,813 | 7/1963 | Beebe et al. | 204—195 |
| 3,211,638 | 10/1965 | Halvorsen | 204—195 |
| 3,223,609 | 12/1965 | Reeds | 204—195 |
| 3,249,103 | 5/1966 | Woodhouse | 128—2.1 |

OTHER REFERENCES

Silver, "The Measurement of Oxygen Tension in Tissues," presented at the Symposium on "Oxygen Measurements in Blood and Tissue and Their Significance," December 8, 1964.

JOHN H. MACK, *Primary Examiner.*

T. TUNG, *Assistant Examiner.*

U.S. Cl. X.R.
204—290, 292, 293